United States Patent [19]

Williams

[11] Patent Number: 4,674,774
[45] Date of Patent: Jun. 23, 1987

[54] ORIENTING MEMBERS IN A PRESELECTED ROTARY ALIGNMENT

[75] Inventor: Ray E. Williams, Los Alamos, N. Mex.

[73] Assignee: The United States of America as represented by the United States Department of Energy, Washington, D.C.

[21] Appl. No.: 676,344

[22] Filed: Nov. 29, 1984

[51] Int. Cl.⁴ .............................................. F16L 27/00
[52] U.S. Cl. ................................... 285/184; 285/330; 285/386
[58] Field of Search ............... 285/328, 330, 403, 404, 285/384, 386, 184, DIG. 7; 464/906; 403/DIG. 6

[56] References Cited

U.S. PATENT DOCUMENTS

| | | | |
|---|---|---|---|
| 967,395 | 8/1910 | Langhaar | 285/330 X |
| 1,307,160 | 6/1919 | Stokes | 285/330 X |
| 1,512,298 | 10/1924 | Mueller | 285/386 X |
| 2,564,915 | 8/1951 | Nelson | 285/403 X |
| 2,705,651 | 4/1955 | Myers . | |
| 2,900,200 | 8/1959 | Umstadter . | |
| 3,064,998 | 11/1962 | Syverson | 285/330 X |
| 3,131,369 | 4/1964 | Krause . | |
| 3,285,628 | 11/1966 | Devries . | |
| 3,623,753 | 11/1971 | Henry . | |
| 4,159,134 | 6/1979 | Shemtov . | |
| 4,211,439 | 7/1980 | Moldestad . | |
| 4,341,482 | 7/1982 | Wollensak . | |

Primary Examiner—Dave W. Arola
Attorney, Agent, or Firm—Lee W. Huffman; Paul D. Gaetjens; Judson R. Hightower

[57] ABSTRACT

An apparatus for orienting members and for maintaining their rotary alignment during orienting members. The apparatus comprises first and second cylindrical elements, a rotation prevention element, a collar and a retainer. Each element has an outside wall, and first and second ends, each end having an outside edge. The first element has portions defining a first plurality of notches located at the outside edge of its first end. An external threaded portion is on the outside wall of the first element and next to the first plurality of notches. The second element has portions defining a second plurality of notches located at the outside edge of its first end. The first plurality has a different number than the second plurality. The first ends of the first and second tubes have substantially the same outside diameter and are abutted during connection so that a cavity is formed whenever first and second tube notches substantially overlap. A rotation prevention element is placed in the cavity to prevent rotation of the first and second elements. A collar with an internal threaded portion is slidably disposed about the second element. The internal threaded portion engages the external threaded portion of the first element to connect the elements. A lip connected to the collar prevents separation of the collar from the second element.

10 Claims, 9 Drawing Figures

ORIENTING MEMBERS IN A PRESELECTED ROTARY ALIGNMENT

This invention is the result of a contract with the department of Energy (Contract No. W-7405-ENG-36).

BACKGROUND OF THE INVENTION

The invention described herein relates generally to orienting members such as tubes and more particularly to structures for connecting a seismic instrument to a positioning arm while maintaining their rotary alignment.

Conventionally, seismic instruments such as geophones have been connected to positioning arms in a trial-and-error manner. As the connecting device around them is tightened, the geophone and positioning arm rotate relative to each another. In order to have the geophone and positioning arm in a desired rotary position after tightening, it is usually necessary to repeat the tightening procedure many times. It is, therefore, desirable to connect geophones to positioning arms in a preselected rotary orientation without having to repeat the connection procedure.

Devices for connecting members in a fixed rotary position are well-known. However, they have the disadvantage of only being able to connect the members in a single determined position. Such a device is disclosed in U.S. Pat. No. 3,285,628 to De Vries. This device utilizes pins to secure adjacent ends of tubular members in a single position. It is desirable to connect adjacent ends of tubular members in any preselected rotary position.

SUMMARY OF THE INVENTION

One object of the present invention is to provide an improved apparatus for connecting tubes.

Another object of the invention is to provide an apparatus for maintaining the rotary alignment of tubes while orienting the tubes.

Still another object of the invention is to provide an apparatus for connecting members in any desired rotary relationship within a small error.

To achieve the foregoing and other objects, and in accordance with the purposes of the present invention, as embodied and broadly described herein, there is provided an apparatus for orienting members and for maintaining their rotary alignment during orientation. The apparatus comprises first and second tubes. Each tube has inside and outside walls and first and second ends. Each end has an inside edge and an outside edge. The first tube has portions defining a first plurality of notches disposed in a spaced-apart pattern at the outside edge of its first end. The first tube includes an external threaded portion on the outside wall and adjacent to the first plurality of notches. The second tube has portions defining a second plurality of notches disposed in a spaced-apart pattern at the outside edge of its first end. The second plurality of notches has a different number of notches than the first plurality of notches. The first end of the second tube has substantially the same outside diameter as the first end of the first tube and is abutted thereto so that a cavity is formed wherever one of the first tube notches and one of the second tube notches substantially overlap. A rotation prevention element is placed within the cavity. The rotation prevention element is sufficiently large relative to the cavity to prevent rotation of the overlapping first tube notch past the overlapping second tube notch. Preferably the cavity is a circular opening and the rotation prevention element is a sphere. A collar is slidably disposed about the second tube. The collar has an internal threaded portion for engaging the external threaded portion of the first tube to connect the second and first tubes. The collar prevents removal of the rotation prevention element from the cavity. A retainer is integrally connected to the collar and prevents separation of the collar from the second tube. The notches in each plurality can be equally spaced-apart.

One advantage of the present invention is that members can be oriented in any desired rotary position within a small error.

Another advantage of the invention is that members can be held in a fixed rotary position while the members are oriented.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
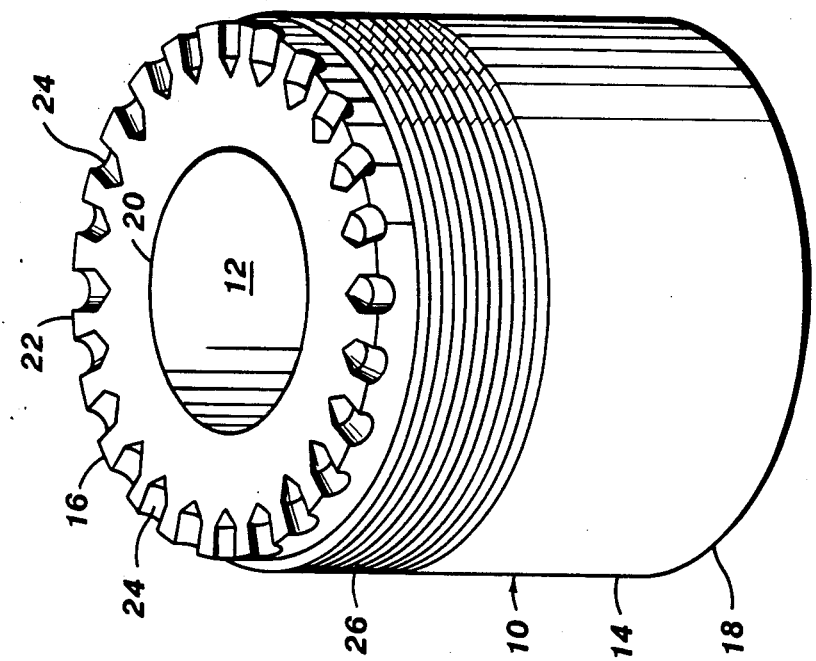
FIG. 1 shows a perspective view of a preferred embodiment of the first tube of the present invention.

Reference is now made to FIG. 1, which shows a perspective view of a preferred embodiment of the first tube 10 of the present invention. First tube 10 has an inside wall 12, an outside wall 14, a first end 16 and a second end 18. First end 16 has an inside edge 20 and an outside edge 22. First tube 10 has portions defining a first plurality of notches 24 located in a spaced-apart pattern at outside edge 22 of first end 16. First tube 10 also includes an external threaded portion 26 located on outside wall 14 near outside edge 22.

Figure 2:
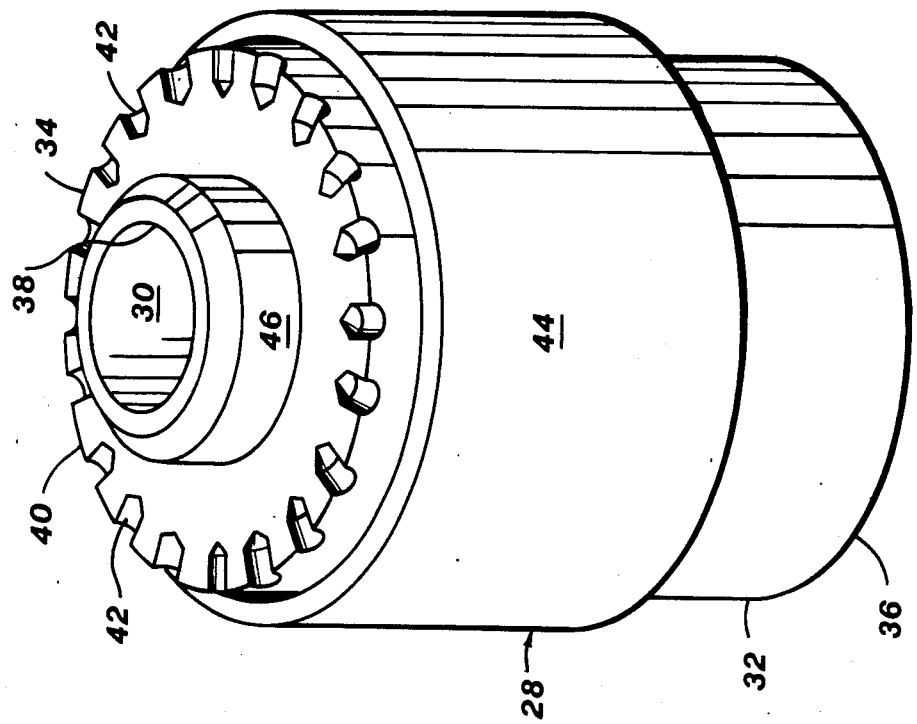
FIG. 2 shows a perspective view of a preferred embodiment of the second tube of the present invention.

FIG. 2 shows a perspective view of a preferred embodiment of the second tube 28 of the present invention. Second tube 28 has an inside wall 30, an outside wall 32, a first end 34 and a second end 36. First end 34 has an inside edge 38 and an outside edge 40. First end 34 has substantially the same outside diameter as the first end 16 of first tube 10 shown in FIG. 1. Second tube 28 has portions defining a second plurality of notches 42 located in a spaced-apart pattern at outside edge 40 of first end 34. Second plurality of notches 42 has a different number of cavities than first plurality of notches 24.

In the preferred embodiments shown in FIGS. 1 and 2, first plurality of notches 24 and second plurality of notches 42 have notches of substantially the same size. Furthermore, the notches in each plurality are equally spaced-apart. In FIG. 1, first plurality of notches 24 has twenty-four notches. In FIG. 2, second plurality of notches 42 has twenty notches. The difference between the number of notches could be smaller or greater than four. Twenty and twenty-four were chosen because of the relative ease of machining an equally-spaced pattern for these numbers. The notches are 15 degrees apart in FIG. 1 and 18 degrees apart in FIG. 2. The maximum alignment error is equal to half the difference between the angular spacing of the notches in first tube 10 and second tube 28. In the embodiment shown, this maximum error is one half of 18 minus 15, or 1.5 degrees. Consequently, if the difference between the number of notches were smaller, the maximum alignment error would also be smaller.

Figure 2A:
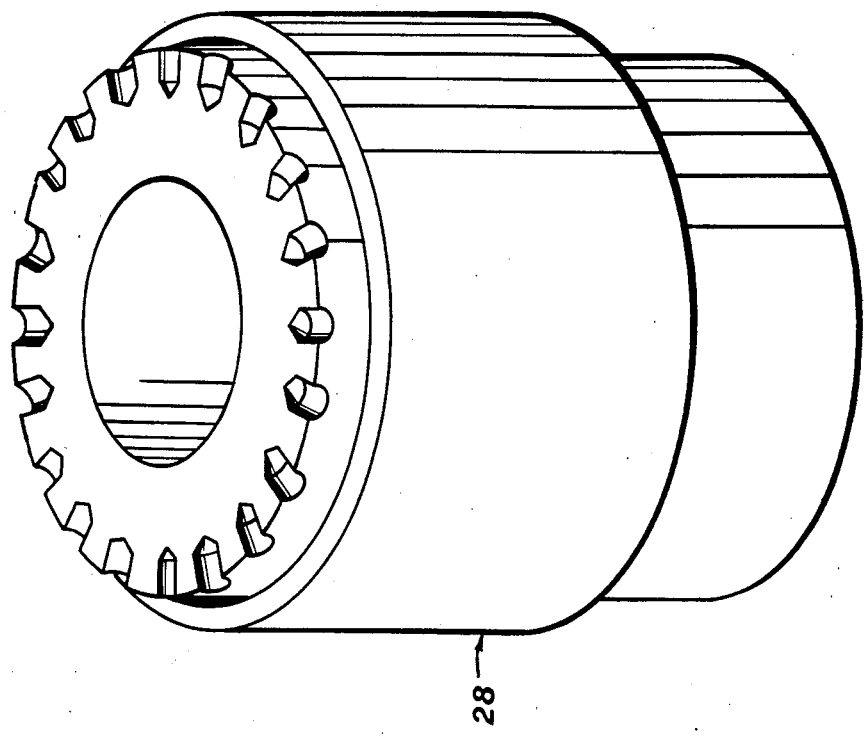
FIG. 2a shows a perspective view of another embodiment of the second tube of the present invention.
Figure 1A:
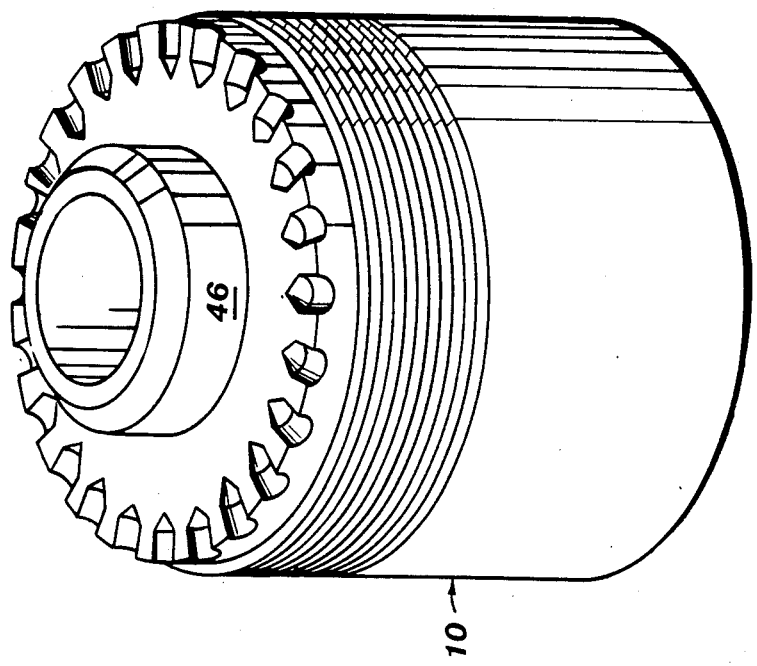
FIG. 1a shows a perspective view of another embodiment of the first tube of the present invention.

Referring again to FIG. 2, a collar 44 is slidably disposed about second tube 28. An insertion portion 46 is located at inside edge 38 of first end 34. Insertion portion 46 has a slightly smaller outside diameter than the inside diameter of first end 16 of first tube 10 shown in FIG. 1. Instead of second tube 28, first tube 10 could have an insertion portion 46, as is shown in FIGS. 1a and 2a. It is not necessary, however, for either tube to have an insertion portion 46.

Figure 3:
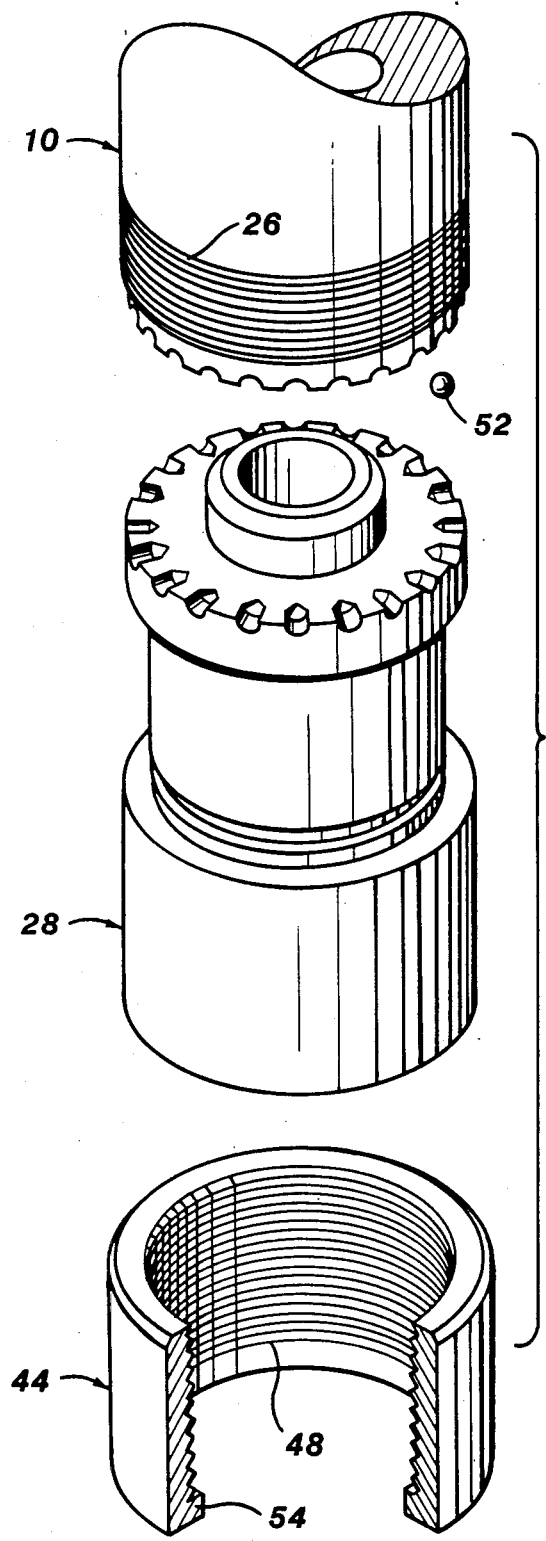
FIG. 3 shows a partial cross-sectional exploded view of a preferred embodiment of the invention.

FIG. 3 shows a partial cross-sectional exploded view of a preferred embodiment of the invention. Collar 44 is shown in a cross-sectional view and removed from second tube 28. Collar 44 has an internal threaded portion 48 corresponding to external threaded portion 26 of first tube 10.

Figure 4:
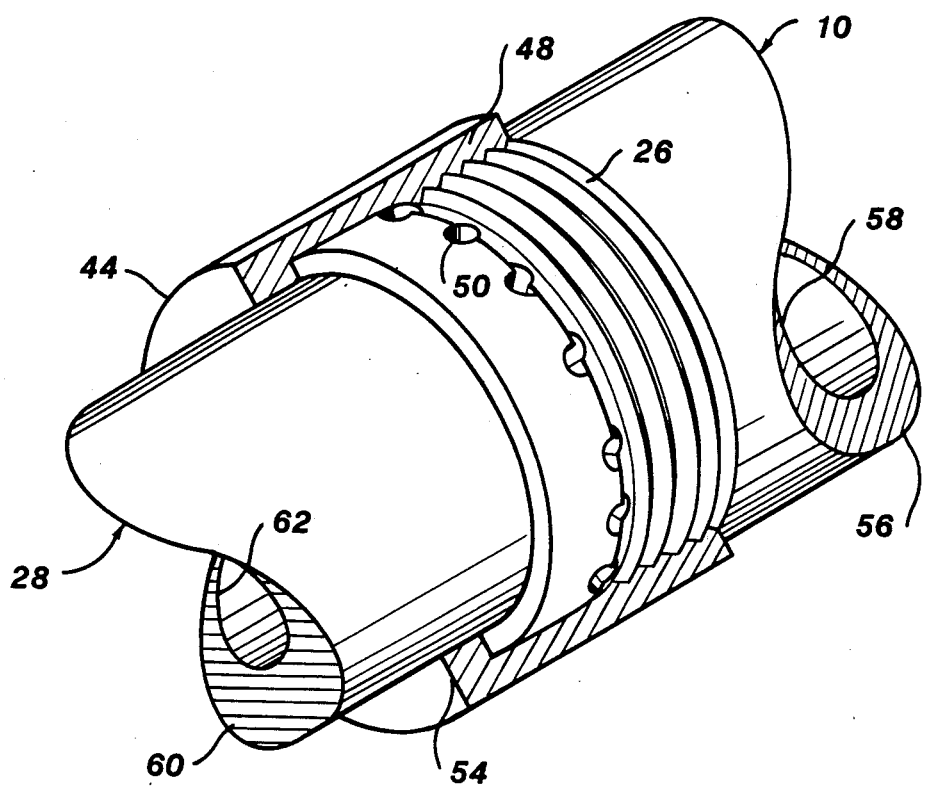
FIG. 4 shows a partial cross-sectional side view of the preferred embodiment of a invention.

When first tube 10 and second tube 28 are abutted, as shown in FIG. 4 which provides a partial cross-sectional side view of the invention, collar 44 can be rotated onto first tube 10 as shown, so that internal threaded portion 48 and external threaded portion 26 interfittably engage. When first tube 10 and second tube 28 are abutted, a cavity 50 is formed wherever notches from each tube substantially overlap. A rotation prevention element 52, shown in FIG. 3, is preferably a sphere and is placed into cavity 50 shown in FIG. 4. Collar 44 is shown rotated onto first tube 10. Rotation prevention element 52 is large enough relative to cavity 50 to prevent the individual notches, which form cavity 50, from rotating relative to each other while collar 44 is rotated. Consequently, first tube 10 and second tube 28 can be connected in a fixed rotary relationship, since collar 44 prevents removal of rotation prevention element 52 from cavity 50.

Collar 44 includes a lip 54 which serves as a retaining structure to prevent separation of collar 44 from second tube 28. Also shown in FIG. 4 are outside edge 56 and inside edge 58 of first tube 10 and outside edge 60 and inside edge 62 of second tube 28.

Figure 5:
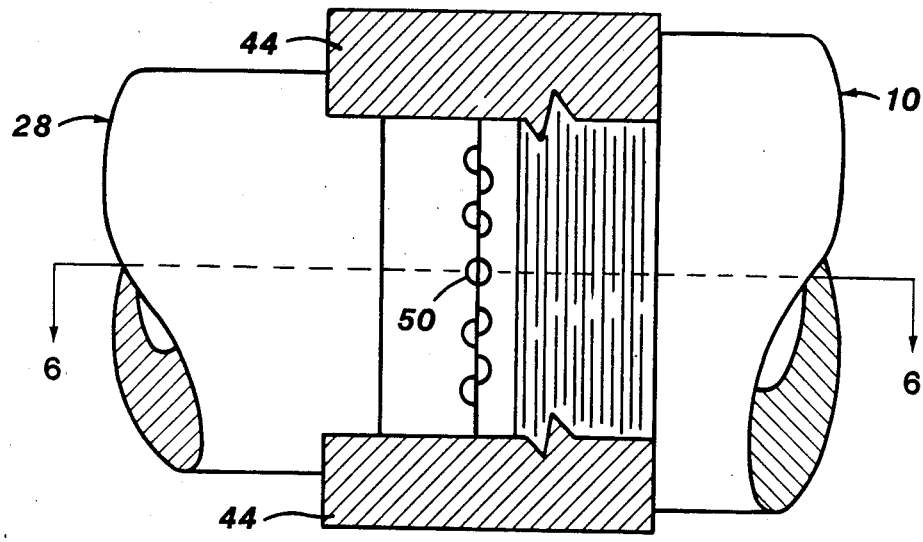
FIG. 5 shows a partial cross-sectional plan view of a preferred embodiment of the invention.

FIG. 5 shows a partial cross-sectional plan view of a preferred embodiment of the invention. Collar 44 is shown in cross-sectional view to clearly show the abutted relationship of first tube 10 and second tube 28. It is apparent that it is a simple matter to rotate first tube 10, second tube 28 or both to change the position of cavity 50.

Figure 6:
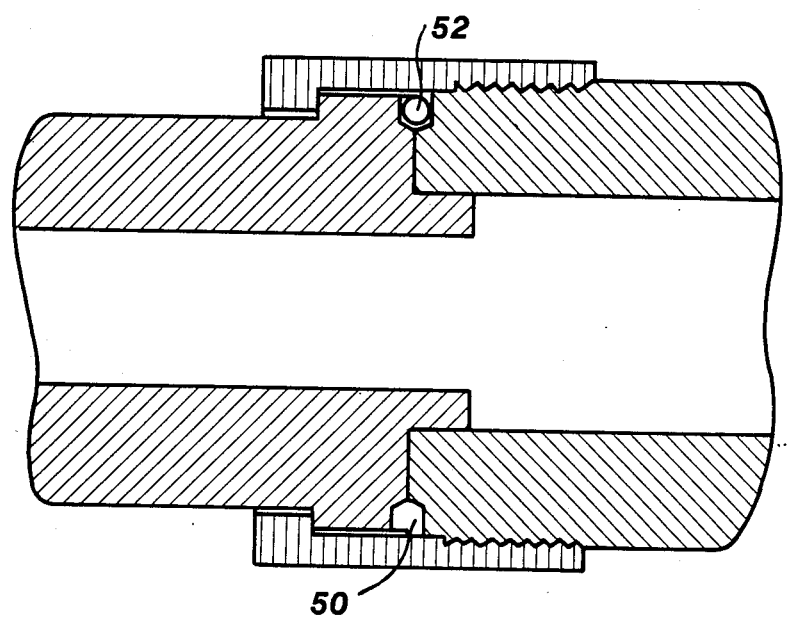
FIG. 6 shows a side view in cross-section of the embodiment shown in FIG. 5, taken along section line 6—6 in FIG. 5.

FIG. 6 shows a side view in cross section of the embodiment shown in FIG. 5, taken along section line 6—6 in FIG. 5. It is apparent from FIG. 6 that 180 degrees opposite from rotation prevention element 52 another cavity 20 is formed. Actually, in the preferred embodiment of the invention shown, a cavity 50 occurs in four locations, each spaced about 90 degrees from the other.

Figure 7:
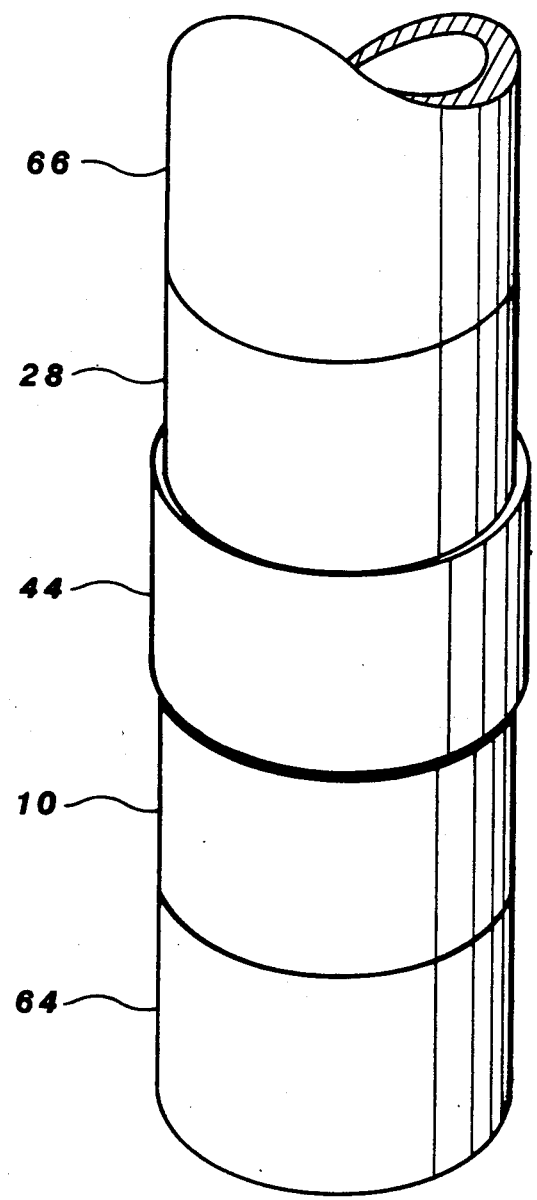
FIG. 7 shows a perspective view of an embodiment of the invention connected to first and second members.

FIG. 7 shows a perspective view of an embodiment of the invention. Collar 44 connects first tube 10 to second tube 28. First tube 10 is connected to first member 64 and second tube 28 is connected to second member 66.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. Those skilled in the art will, after studying the teachings of the present invention, appreciate that the members to be oriented can be attached to first tube 10 and second tube 28, respectively, or that the members can be integral with first tube 10 and second tube 28. It is intended that the scope of the invention be defined by the claims appended hereto.

What is claimed is:

1. An apparatus for orienting first and second members in a preselected rotary alignment and for maintaining their rotary alignment during orientation, said apparatus comprising:
   a. a first cylindrical element having an outside wall and first and second ends, each of said ends having an outside edge, said first cylindrical element having portions defining a first plurality of notches disposed in a spaced-apart pattern at said outside edge of said first end, said first cylindrical element having an external threaded portion disposed on said outside wall and adjacent to said first plurality of notches, said first cylindrical element being connected at its second end to the first member;
   b. a second cylindrical element having an outside wall and first and second ends, each of said ends having an outside edge, said first end of said second cylindrical element having substantially the same outside diameter as said first end of said first cylindrical element and having portions defining a second plurality of notches disposed in a spaced-apart pattern at said outside edge of said first end of said second cylindrical element, said second plurality of notches having a different number of notches than said first plurality of notches, said first cylindrical element first end and said second cylindrical element first end being abutted so that a cavity is formed wherever one of said first cylindrical element notches and one of said second cylindrical element notches substantially overlap, said second cylindrical element being connected at its second end to the second member;

c. a rotation prevention element for placement within said cavity, said rotation prevention element being sufficiently large relative to said cavity to prevent rotation of said overlapping first cylindrical element notch past said overlapping second cylindrical element notch;

d. a collar slidably disposed about said second cylindrical element, said collar having an internal threaded portion for interfittably engaging said external threaded portion of said first cylindrical element to connect said second and first cylindrical elements, said collar preventing removal of said rotation prevention element from said cavity; and e. retaining means for preventing separation of said collar from said second cylindrical element, said retaining means being connected to said collar.

2. The invention of claim 1 wherein said first plurality of cavities and said second plurality of cavities comprise cavities of substantially the same size.

3. The invention of claim 1 wherein the pattern formed by said first plurality of cavities comprises a pattern of equally spaced-apart cavities.

4. The invention of claim 1 wherein the pattern formed by said second plurality of cavities comprises a pattern of equally spaced-apart cavities.

5. The invention of claim 1 wherein said orifice comprises a circular opening.

6. The invention of claim 5 wherein said rotation prevention element comprises a sphere.

7. The invention of claim 1 wherein said first cylindrical element includes an inside edge at its first and second ends and an inside wall; and said second cylindrical element includes an inside edge at its first and second ends and an inside wall.

8. The invention of claim 7 wherein said second cylindrical element includes an insertion portion located at said inside edge of said first end of said second cylindrical element, said insertion portion being received within said first end of said first cylindrical element.

9. The invention of claim 7 wherein said first cylindrical element includes an insertion portion located at said inside edge of said first end of said first cylindrical element, said insertion portion being received within said first end of said second cylindrical element.

10. The invention of claim 7 wherein said first and second cylindrical elements comprise first and second tubes.

* * * * *